(12) United States Patent
De'Longhi et al.

(10) Patent No.: US 11,134,806 B2
(45) Date of Patent: Oct. 5, 2021

(54) DISASSEMBLABLE DOUBLE-WALLED FILTER FOR COFFEE MACHINE WITH TIGHTENING ELEMENT

(71) Applicant: DE'LONGHI APPLIANCES SRL, Treviso (IT)

(72) Inventors: Giuseppe De'Longhi, Treviso (IT); Luciano Scian, Treviso (IT); Massimo Poggioli, Treviso (IT)

(73) Assignee: De'Longhi Appliances Srl, Treviso (IT)

(*) Notice: Subject to any disclaimer, the term of this patent is extended or adjusted under 35 U.S.C. 154(b) by 169 days.

(21) Appl. No.: 16/084,763

(22) PCT Filed: Mar. 17, 2017

(86) PCT No.: PCT/IB2017/051557
§ 371 (c)(1),
(2) Date: Sep. 13, 2018

(87) PCT Pub. No.: WO2017/158562
PCT Pub. Date: Sep. 21, 2017

(65) Prior Publication Data
US 2019/0082879 A1    Mar. 21, 2019

(30) Foreign Application Priority Data
Mar. 17, 2016 (IT) .......................... 102016000028287

(51) Int. Cl.
*A47J 31/06* (2006.01)

(52) U.S. Cl.
CPC ....... *A47J 31/0663* (2013.01); *A47J 31/0642* (2013.01)

(58) Field of Classification Search
None
See application file for complete search history.

(56) References Cited

U.S. PATENT DOCUMENTS 3,983,007 A * 9/1976 Au .......................... C12M 33/04
435/30
4,100,394 A * 7/1978 Tilp ...................... A47J 31/542
219/438
(Continued)

FOREIGN PATENT DOCUMENTS

CA    2181246 A1    9/1995
CN    1 293 019 A    5/2001
(Continued)

OTHER PUBLICATIONS

English translation of Official Action issued by Chinese Patent Office dated May 27, 2020 with respect to parallel Chinese Patent Application No. 201780022966.7.
(Continued)

*Primary Examiner* — Ibrahime A Abraham
*Assistant Examiner* — Gyounghyun Bae
(74) *Attorney, Agent, or Firm* — Scott R. Cox

(57) ABSTRACT

A filter for a coffee machine comprises a cup-shaped body (2) for containing coffee powder, having at least a bottom wall (3) having an opening (5); a filtering wall (6) placed in the cup-shaped body (2) upstream of the opening (5) and removably associated with the cup-shaped body (2); a seal (7) placed at least between one edge (6b) of the filtering wall (6) and the cup-shaped body (2); a tightening member (8) active on the filtering wall (6) and on the seal (7) so as to reversibly fix said filtering wall (6) and said seal (7) to the cup-shaped body (2); said tightening member (8) comprising a tubular element (9) connected to the filtering wall (6) and to the seal (7) and arranged through the opening (5); said tubular element (9) being directly constrained to the cup-shaped body (2) by means of a bayonet-type connection.

13 Claims, 2 Drawing Sheets

(56) References Cited

U.S. PATENT DOCUMENTS

| | | | |
|---|---|---|---|
| 4,231,876 A | | 11/1980 | Zimmermann et al. |
| 4,300,442 A | * | 11/1981 | Martin .................... A47J 31/44 222/228 |
| 4,343,232 A | * | 8/1982 | Corbier ............... A47J 31/0621 99/295 |
| 4,477,347 A | * | 10/1984 | Sylva .................... B01D 29/01 210/232 |
| 4,875,408 A | * | 10/1989 | McGee ................. A47J 31/057 99/283 |
| 4,888,466 A | * | 12/1989 | Hoffmann ........... A47J 31/0576 392/444 |
| 5,150,645 A | * | 9/1992 | Schiettecatte ....... A47J 31/0663 99/295 |
| 5,634,394 A | * | 6/1997 | Cortese ............... A47J 31/0684 99/287 |
| 5,715,741 A | * | 2/1998 | Gasser ................ A47J 31/0663 210/455 |
| 5,913,962 A | * | 6/1999 | Gasser ................ A47J 31/4496 99/293 |
| 6,093,237 A | * | 7/2000 | Keller ................ B01D 46/0024 95/287 |
| 6,195,912 B1 | * | 3/2001 | Moon .................... A23N 12/08 34/577 |
| 6,272,974 B1 | * | 8/2001 | Pascotti .............. A47J 31/0615 99/279 |
| 6,533,288 B1 | * | 3/2003 | Brandner ............... B60K 15/03 220/304 |
| 7,490,542 B2 | * | 2/2009 | Macchi ............... A47J 31/3695 426/433 |
| 7,832,328 B2 | * | 11/2010 | Koeling ............. B65D 85/8043 99/284 |
| 7,836,819 B2 | * | 11/2010 | Suggi Liverani ... A47J 31/0668 99/295 |
| 7,845,270 B2 | * | 12/2010 | Rahn ................... A47J 31/3685 99/289 R |
| 8,409,646 B2 | * | 4/2013 | Yoakim ............... A47J 31/0642 426/115 |
| 8,431,175 B2 | * | 4/2013 | Yoakim ................. A47J 31/407 426/433 |
| 8,563,058 B2 | * | 10/2013 | Roulin .................. A47J 31/407 426/115 |
| 8,667,890 B2 | | 3/2014 | Macchi |
| 8,808,777 B2 | | 8/2014 | Kamerbeek et al. |
| 8,906,435 B2 | | 12/2014 | Kamerbeek et al. |
| 8,986,764 B2 | * | 3/2015 | Yoakim ................... A23F 5/262 426/115 |
| 9,271,601 B2 | | 3/2016 | Kamerbeek et al. |
| 9,327,900 B2 | * | 5/2016 | Cafaro ....................... A23L 2/56 |
| 9,604,776 B2 | | 3/2017 | Kamerbeek et al. |
| 9,656,798 B2 | | 5/2017 | Kamerbeek et al. |
| 10,392,184 B2 | | 8/2019 | Kamerbeek et al. |
| 2007/0028783 A1 | | 2/2007 | Chen et al. |
| 2008/0041232 A1 | * | 2/2008 | Fai ...................... A47J 31/4467 99/279 |
| 2010/0186599 A1 | * | 7/2010 | Yoakim .............. B65D 85/8043 99/295 |
| 2013/0263423 A1 | | 10/2013 | Clark |
| 2014/0290493 A1 | * | 10/2014 | Rivera ................ A47J 31/0663 99/285 |
| 2016/0106254 A1 | | 4/2016 | Eyrignoux |

FOREIGN PATENT DOCUMENTS

| | | |
|---|---|---|
| CN | 1 012 141 24 A | 7/2008 |
| CN | 2016/58242 U | 12/2010 |
| CN | 10262690 A | 8/2012 |
| DE | 7435607 U | 2/1975 |
| DE | 19620381 A1 | 1/1997 |
| DE | 202015103015 U1 | 6/2015 |
| EP | 0682902 A1 | 11/1995 |
| EP | 0861679 A1 | 9/1998 |
| EP | 1749463 A1 | 2/2007 |
| EP | 2 805 651 A1 | 11/2014 |
| FR | 1255021 A | 3/1961 |
| JP | S54117279 A | 12/1979 |
| WO | 02/091889 A2 | 11/2002 |
| WO | 2007/036078 A1 | 4/2007 |
| WO | 2007080258 A2 | 7/2007 |
| WO | WO2010/033023 A2 | 3/2010 |
| WO | 2011/097866 A1 | 8/2011 |

OTHER PUBLICATIONS

English Translation of Official Action with Search Report issued by Chinese Patent Office dated Mar. 30, 2020 with respect to Chinese Patent Application No. 201780022945.5—parallel application in relation to potentially related U.S. Appl. No. 16/084,750—cited only for references that are disclosed therein.
U.S. Appl. No. 16/084,742.
U.S. Appl. No. 16/084,750.
International Search Report with Written Opinion of the International Searching Authority, dated Jun. 7, 2017, with respect to International Application No. PCT/IB2017/051559—cited only for references that are disclosed therein.
International Preliminary Report on Patentability of the International Searching Authority, dated Sep. 18, 2018, with respect to International Application No. PCT/IB2017/051559—cited only for references that are disclosed therein.
European Search Report issued by Italian Patent Office dated Dec. 14, 2016 with respect to ITUA20161785—cited only for references that are disclosed therein.
International Search Report with Written Opinion of the International Searching Authority, dated Jun. 30, 2017, with respect to International Application No. PCT/IB2017/051560—cited only for references that are disclosed therein.
International Preliminary Report on Patentability of the International Searching Authority, dated Sep. 18, 2018, with respect to International Application No. PCT/IB2017/051560—cited only for references that are disclosed therein.
European Search Report issued by Italian Patent Office dated Dec. 2, 2016 with respect to ITUA20161788—cited only for references that are disclosed therein.
International Search Report with Written Opinion of the International Searching Authority, dated Jul. 4, 2017, with respect to International Application No. PCT/IB2017/051557—cited only for references that are disclosed therein.
International Preliminary Report on Patentability of the International Searching Authority, dated Sep. 18, 2018, with respect to International Application No. PCT/IB2017/051557—cited only for references that are disclosed therein.
European Search Report issued by Italian Patent Office dated Dec. 19, 2016 with respect to ITUA20161783—cited only for references that are disclosed therein.
English Translation of Official Action with Search Report issued by Chinese Patent Office dated Apr. 9, 2020 with respect to Chinese Patent Application No. 201780024276.5—parallel application in relation to potentially related U.S. Appl. No. 16/084,742—cited only for references that are disclosed therein.
English Translation of Official Action issued by Japanese Patent Office dated Jan. 4, 2021 with respect to Japanese Patent Application No. 2019-500041—parallel application in relation to potentially related U.S. Appl. No. 16/084,742.
Office Action issued by United States Patent & Trademark Office dated Feb. 26, 2021 with respect to potentially related U.S. Appl. No. 16/084,742.

* cited by examiner

DISASSEMBLABLE DOUBLE-WALLED FILTER FOR COFFEE MACHINE WITH TIGHTENING ELEMENT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Note Applicable

BACKGROUND OF THE INVENTION

(1) Field of the Invention

The present invention concerns a filter for a coffee machine. In particular, the present invention can be applied in the so-called double-walled filters.

(2) Description of Related Art Including Information Disclosed Under 37 CFR 1.97 and 1.98

In fact, filters are known comprising a cup-shaped body having a bottom wall and a substantially cylindrical lateral wall connected to the bottom wall. A compartment is defined in the cup-shaped body for the coffee powder.

The filter is intended to be inserted in a filter holder that is coupled to the coffee machine for making the beverage. An opening is provided in the bottom wall for the infused coffee to exit.

A filtering wall is arranged within the cup-shaped body compartment. The filtering wall is substantially flat and has a multitude of through holes that allow the infused coffee to pass and retain the coffee powder in the compartment. A seal may be placed between the filtering wall and the cup-shaped body to prevent the coffee powder passing into the gap and through the exit opening.

Known filters further comprise a coupling member necessary for coupling the filtering wall and the cup-shaped seal. The coupling member comprises a plate fixed to the seal and to the filtering wall and a tubular element as a single piece with the plate and coaxial thereto and inserted in the aforementioned exit opening. A threaded locking ring is constrained to the tubular element by means of threading. The locking ring prevents the tubular element sliding through the opening and therefore keeps the filtering wall, the seal and the plate tightened to one another.

Within the tubular element an outlet channel is defined for the infused beverage. A flow regulation valve is placed within the tubular element. Such valve is also useful for defining the throttling that accelerates the flow of the beverage at the exit so as to create a coffee cream. Such filters are also known for example from document WO_02/091889_A2.

Filters of the known type described have some drawbacks. They are, above all, complex to construct and assemble due to the large number of elements of which they are composed. Furthermore, filters of the known type are difficult to clean. In fact, when a cleaning operation is necessary, they must be disassembled into all the components, cleaned and then reassembled. Still due to the high number of components, this operation is long and inconvenient.

BRIEF SUMMARY OF THE INVENTION

An object of the present invention is to propose a filter for a coffee machine that avoids the described drawbacks. In particular, it is an object of the present invention to propose a filter for a coffee machine that is simple and convenient to clean. Furthermore, it is a further object of the present invention to propose a filter for a coffee machine that is simple to construct.

The objects of the present invention are reached by a filter for coffee machines comprising the characteristics of one or more of the appended claims. According to the present invention, a filter for a coffee machine comprises a cup-shaped body for containing coffee powder, having at least a bottom wall which has an opening; a filtering wall placed in the cup-shaped body upstream of the opening and removably associated with the cup-shaped body; a seal placed at least between one edge of the filtering wall and the cup-shaped body; a tightening member active on the filtering wall and on the seal so as to reversibly fix said filtering wall and said seal to the cup-shaped body; the tightening member comprises a tubular element connected to the filtering wall and to the seal and arranged through the opening; the tubular element is directly constrained to the cup-shaped body by means of a bayonet-type connection.

This solution allows the filtering wall and the seal to be assembled and disassembled extremely quickly and simply form the cup-shaped body. When it is necessary to proceed with the cleaning of the filter, the step of separating all its components is therefore made extremely simpler and quicker.

This advantage is firstly appreciated in the domestic environment, but is particularly useful in the professional environment where cleaning operations imply machine downtime that is naturally undesirable. Furthermore, it is to be noted that the bayonet-type connection implies construction simplification with a reduction in the number of elements constituting the filter. By way of example, in the solution described, no fixing ring to be associated with the tubular element is necessary.

According to a further aspect of the present invention, the bottom wall has at least a through slot and the tubular element comprises at least one tongue that can be inserted into the slot for making the bayonet-type connection. Preferably, the bottom wall has two slots and the tubular element comprises two tongues; each tongue can be inserted in a corresponding slot for making the bayonet-type connection.

This solution enables the bayonet-type connection to be made effectively and reliably.

According to a further aspect of the present invention, the slots are arranged in diametrically opposite positions relative to a centre of the bottom wall; the tongues are arranged in diametrically opposite positions relative to a central axis of symmetry of the tubular element. This solution enables a balanced and symmetrical distribution of the necessary forces for guaranteeing the connection. In this situation, the tightening member does not suffer excessive strain, preventing any damage that can compromise the reliability of the filter.

According to a further aspect of the present invention, the tightening member comprises a disk fixed to the tubular element coaxially thereto and associated with the filtering wall and with the seal. This characteristic allows the tightening member to be simply connected to the seal and to the filtering wall. In fact, these are the components that must be tightened by the tightening member.

According to a further aspect of the present invention, the disk has a dispensing hole to permit a beverage coming from the filtering wall to exit. The hole has a diameter comprised between 0.3 mm and 0.5 mm and preferably is substantially equal to 0.4 mm.

It is to be observed that the term "dispensing hole" here means a passage of small dimensions and such as to determine a notable acceleration of the flow of beverage in transit. Such acceleration is also at the origin of the high flow turbulence which causes a marked mixing of air with the consequent formation of a coffee cream or froth.

A person skilled in the art will realise that the presence of such dispensing hole makes the presence of flow regulation valves superfluous, at least with reference to the production of the coffee cream. The absence of valves determines a notable construction simplification of the filter according to the present invention. Furthermore, it is clear that, following the simplification in the construction of the filter and in particular following the further reduction in the number of components, the cleaning of the filter becomes even simpler.

According to a further aspect of the present invention, the dispensing hole faces the tubular element. This allows the space defined within the tubular element to be used for making the flow of beverage flow out of the dispensing hole.

BRIEF DESCRIPTION OF THE SEVERAL VIEWS OF THE DRAWING(S)

Within the scope of the present description, reference shall be made to the appended figures in which.

DETAILED DESCRIPTION OF THE INVENTION

Figure 1:
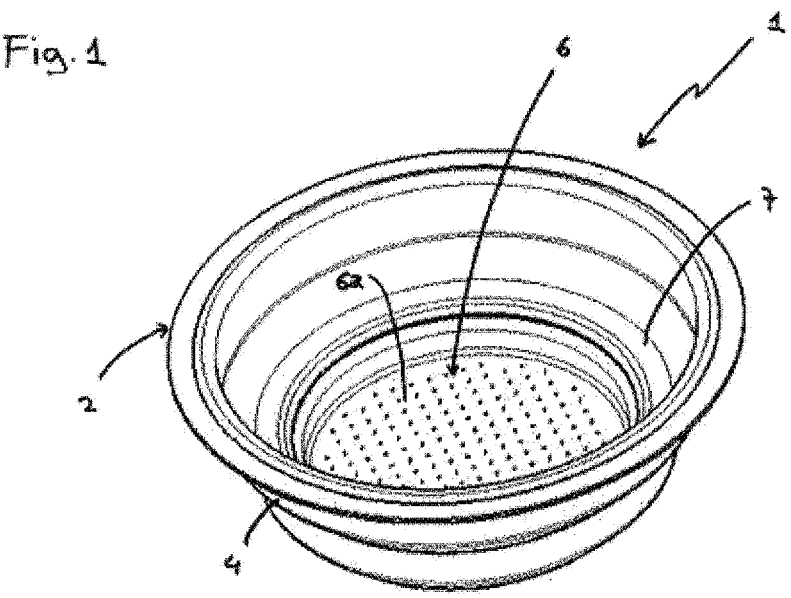
FIG. 1 represents an axonometric view of a filter for coffee machines according to the present invention.
Figure 2:
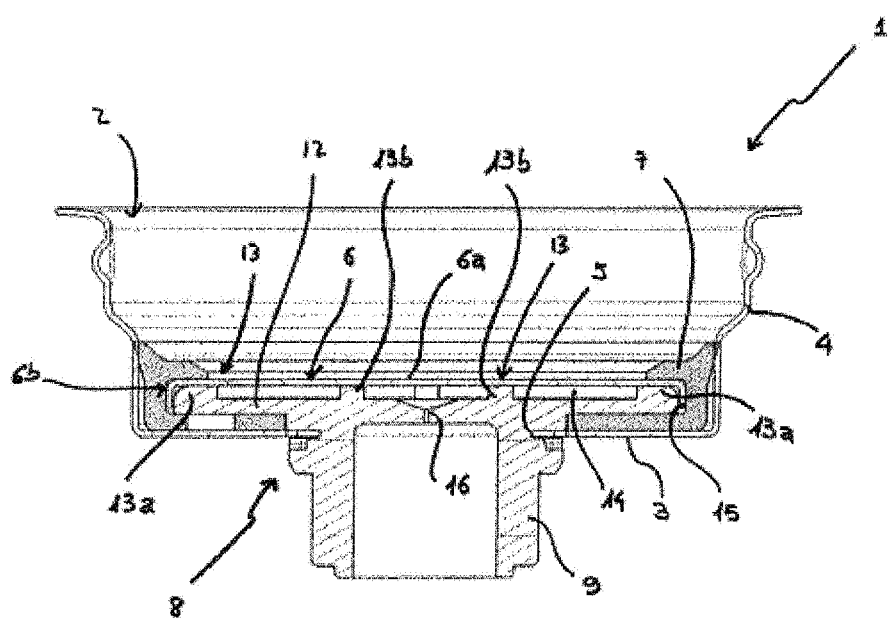
FIG. 2 represents a sectional view of the filter for coffee machines of FIG. 1.

With reference to the appended figures, a filter for coffee machines according to the present invention is indicated in its entirety by the number 1. The filter 1 comprises a cup-shaped body 2 having a bottom wall 3 and a lateral wall 4 fixed to the bottom wall 3. In the cup-shaped body 2 a compartment is therefore defined for containing a predetermined dose of coffee powder. As shown, the cup-shaped body 2 has an axisymmetric shape and is made of metal material. The cup-shaped body 2 is, in use, intended to be inserted in a filter holder of a coffee machine.

In the bottom wall 3 of the cup-shaped body 2 an opening 5 is made which allows the beverage to exit the filter 1 in the way that will appear clear below. The opening 5 has a circular shape.

The filter 1 further comprises a filtering wall 6, arranged within the cup-shaped body 2 and placed upstream of the opening 5. The filtering wall 6 comprises a flat portion 6a, having a multitude of through holes through which the infused beverage passes, retaining the particles of coffee powder.

It is to be observed here that the flat shape of the portion 6a of the filtering wall is not a limiting characteristic and may be substituted by a convex or concave curved shape or any other shape.

The filtering wall 6 further comprises an edge 6b that extends perimetrally to the flat portion 6a. The filtering wall 6 is removably associated with the cup-shaped body 2. In more detail, the filtering wall is arranged in the cup-shaped body 2 so that the edge 6b is coupled to the cup-shaped body 2. In particular, the edge 6b is preferably coupled to the lateral wall 4. The filtering wall 6 is in general made of metal material, but other materials such as plastic are just as possible.

The filter 1 further comprises a seal 7 placed between the filtering wall 6 and the cup-shaped body 2. In more detail, the seal is placed at least between the edge 6b of the filtering wall 6 and the cup-shaped body 2. Such seal 7 prevents a flow between the filtering wall 6 and the cup-shaped body 2 which would also cause the passage of coffee powder which would contaminate the beverage.

It is to be noted that in the step of making the beverage, the filter 1 is crossed by a flow of hot water under pressure. The water flow pressure can reach a value of 9-10 bar. The seal 7 is therefore made so as to withstand such pressure. In this example, in a non-limiting way, the seal 7 is made of elastomeric material, for example, silicone rubber.

The filter 1 further comprises a tightening member 8 active at least on the filtering wall 6 and on the seal 7 to fix such elements in a removable way to the cup-shaped body 2. The tightening member 8 allows a simple and quick coupling and uncoupling of the filtering wall 6 and the seal 7 from the cup-shaped body 2. Advantageously, this allows the cleaning steps of such pieces and therefore of the entire filter 1 to be made quicker and simpler.

The tightening member 8 comprises a tubular element 9 removably fixed (in the way that will be clear in the present description below) to the filtering wall 6 and to the seal 7. The tubular element 9 is further arranged through the opening 5 and coaxially thereto. The tubular element 9 has a circular shaped section.

Figure 3:
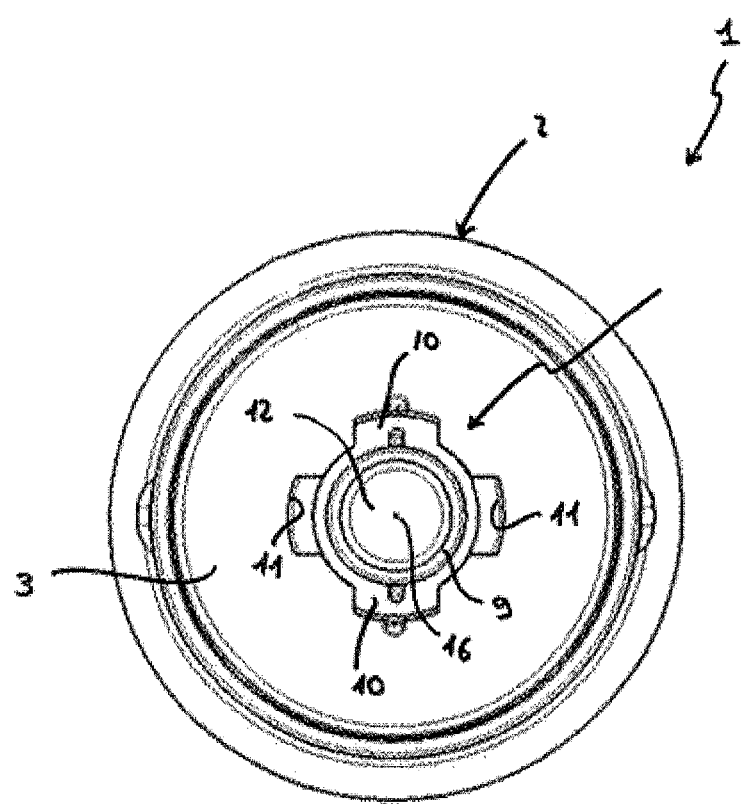
FIG. 3 is a plan view of the filter of FIG. 1.

In accordance with the present invention, the tubular element 9 is directly constrained to the cup-shaped body 2 through a bayonet-type connection. In the embodiment shown in the figures, in detail in FIG. 3, the tubular element 9 comprises two tongues 10 that extend radially from the tubular element 9 itself. The tongues 10 are coplanar to one another. More precisely, the tongues 10 lie on a substantially orthogonal plane to a central axis of symmetry of the tubular element 9. The tongues 10 are arranged in diametrically opposite positions with respect to the central axis of symmetry of the tubular element 9.

Furthermore, the bottom wall 3 of the cup-shaped body 2 has two through slots 11. The slots 11 are arranged diametrically opposite the centre of the bottom wall 3. The slots 11 are substantially counter-shaped to the tongues 10.

In fact, in a step of coupling the tightening member 8 with the cup-shaped body 2, each tongue 10 is inserted into a respective slot 11 in order to cross the bottom wall 3. By rotating the tubular element 9, in the example depicted in FIG. 3 by 90°, the tongues 10 are no longer at the slots 11 and the tubular element 9 is not further separable from the bottom wall 3. In this way, the bayonet-type connection mentioned above is made.

The tightening member 8 further comprises a disk 12 fixed coaxially to the tubular element 9. The disk 12 is further connected to the filtering wall 6 and to the seal 7 for connecting them to the tightening member 8. In more detail, the disk 12 and the tubular element 9 are made as a single piece. The disk 12 and the tubular element 9 are made of plastic material. The disk 12 has a circular shape and is coupled to the filtering wall 6. The diameter of the filtering wall 6 is substantially equal to the diameter of the disk 12. The disk 12 is alongside, in contact and superimposed on the filtering wall 6.

The disk 12 further comprises spacer elements 13 that allow the definition of a gap 14 between the disk 12 and the filtering wall 6. In other words, the disk 12 is in contact with the filtering wall 6 through the spacer elements 13. The spacer elements 13 comprise a peripheral ring 13a that rises from the edge of the disk 12. Furthermore, the spacer elements 13 comprise protrusions 13b that extend from a central portion of the disk 12.

The shape, position and number of spacer elements 13 are in no way limiting characteristics. In fact, the disk 12 may have any number of such elements and of any shape.

The filtering wall 6 and the disk 12 are removably inserted in a seat 15 afforded perimetrally in the seal 7. In this way, the filtering wall 6, the seal 7 and the disk 12 are solidly but reversably joined. In other words, the filtering wall 6 and the seal 7 are connected to the tightening member 8 through the disk 12.

The disk 12 has a through dispensing hole 16 which allows a beverage coming from the filtering wall 6 to exit. The dispensing hole 16 is placed in a central and coaxial position to the disk 12 itself and to the tubular element 9. The dispensing hole 16 therefore faces the tubular element 9 and opens into it.

The dispensing hole 16 has a portion with a constant diameter and a flared portion. In detail, the flared portion faces the filtering wall 6. The diameter of the dispensing hole 16, at least in its constant diameter portion, is comprised between 0.3 mm and 0.5 mm. In the embodiment described and illustrated, such diameter is 0.4 mm. Such diameter allows a sensitive acceleration of the beverage flow to allow the creation of coffee cream. The invention thus described reaches the pre-set objects. In fact, thanks to the bayonet coupling which connects the cup-shaped body and the filtering wall to one another, it is particularly quick and convenient to disassemble the filter into all its components for being able to clean them. In fact, it is only necessary to promote a rotation of the tightening member, aligning the tongues with the slots, for proceeding with the disassembly.

Furthermore, the absence of further tightening elements (like, for example, the threaded locking ring) limits the number of filter components, simplifying its construction. Naturally, the cleaning is also simplified following the reduction in components.

The invention claimed is:

1. A filter for a coffee machine, the filter comprising a cup-shaped body for containing coffee powder, wherein the cup-shaped body comprises at least a bottom wall comprising an opening; a filtering wall placed in the cup-shaped body upstream of the opening and removably associated with the cup-shaped body; a seal placed at least between an edge of the filtering wall and the cup-shaped body; and a tightening member on the filtering wall and on the seal, wherein the tightening member reversibly fixes said filtering wall and said seal to the cup-shaped body, wherein said tightening member comprises a tubular element connected to the filtering wall and to the seal and arranged through the opening, characterised in that said tubular element is constrained to the cup-shaped body by a bayonet-type connection and wherein said bottom wall further comprises at least one through slot and said tubular element comprises at least one tongue insertable in said at least one through slot in order to make said bayonet-type connection.

2. The filter according to claim 1, characterised in that said bottom wall further comprises two slots and said tubular element comprises two tongues insertable in a corresponding slot in order to make said bayonet-type connection.

3. The filter according to claim 2, characterised in that said two slots are arranged in diametrically opposite positions relative to a centre of said bottom wall, wherein said two tongues are arranged in diametrically opposite positions relative to a central axis of symmetry of said tubular element.

4. The filter according to claim 1, characterised in that said tightening member further comprises a disk fixed coaxially to the tubular element and associated with said filtering wall and with said seal.

5. The filter according to claim 4, characterised in that said disk further comprises a dispensing hole to permit a beverage coming from the filtering wall to exit the filter.

6. The filter according to claim 5, characterised in that said dispensing hole has a diameter between 0.3 mm and 0.5 mm.

7. The filter according to claim 5, characterised in that said dispensing hole faces the tubular element.

8. A filter for a coffee machine, the filter comprising a cup-shaped body for containing coffee powder, wherein the cup-shaped body comprises at least a bottom wall comprising an opening; a filtering wall placed in the cup-shaped body upstream of the opening and removably associated with the cup-shaped body; a seal placed at least between an edge of the filtering wall and the cup-shaped body; and a tightening member on the filtering wall and on the seal,
    wherein the tightening member reversibly fixes said filtering wall and said seal to the cup-shaped body,
    wherein said tightening member comprises a tubular element connected to the filtering wall and to the seal and arranged through the opening, characterised in that said tubular element is constrained to the cup-shaped body by a bayonet-type connection;
    wherein the tightening member further comprises a disk;
    wherein the filtering wall and the disk are removably inserted in a seat afforded perimetrally in the seal; and
    wherein said bottom wall further comprises at least one through slot and said tubular element comprises at least one tongue insertable in said at least one through slot in order to make said bayonet-type connection.

9. The filter according to claim 8, characterised in that said bottom wall further comprises two slots and said tubular element comprises two tongues insertable in a corresponding slot in order to make said bayonet-type connection.

10. The filter according to claim 9, characterised in that said two slots are arranged in diametrically opposite positions relative to a centre of said bottom wall, wherein said two tongues are arranged in diametrically opposite positions relative to a central axis of symmetry of said tubular element.

11. The filter according to claim 8, characterised in that said disk further comprises a dispensing hole to permit a beverage coming from the filtering wall to exit the filter.

12. The filter according to claim 11, characterised in that said dispensing hole has a diameter between 0.3 mm and 0.5 mm.

13. The filter according to claim 11, characterised in that said dispensing hole faces the tubular element.

\* \* \* \* \*